(12) United States Patent
Diggins

(10) Patent No.: US 7,168,464 B2
(45) Date of Patent: Jan. 30, 2007

(54) DUAL-SERVICE SYSTEM AND METHOD FOR COMPRESSING AND DISPENSING NATURAL GAS AND HYDROGEN

(75) Inventor: David A. Diggins, Midland, TX (US)

(73) Assignee: Pinnacle CNG Systems, LLC, Midland, TX (US)

(*) Notice: Subject to any disclaimer, the term of this patent is extended or adjusted under 35 U.S.C. 154(b) by 372 days.

(21) Appl. No.: 10/937,055

(22) Filed: Sep. 9, 2004

(65) Prior Publication Data

US 2006/0071016 A1 Apr. 6, 2006

(51) Int. Cl.
*B65B 1/04* (2006.01)

(52) U.S. Cl. ............................ 141/105; 141/9; 141/82; 141/95; 141/192; 141/302; 222/145.6; 222/145.8; 137/263; 137/602

(58) Field of Classification Search ............... 141/2, 141/9, 67, 94, 95, 100–105, 192, 234, 285, 141/302, 82; 137/263, 602; 222/129, 145.1, 222/145.5, 145.6, 145.7, 145.8
See application file for complete search history.

(56) References Cited

U.S. PATENT DOCUMENTS

| | | | | |
|---|---|---|---|---|
| 3,837,377 | A | 9/1974 | McJones ........................ 141/4 |
| 4,153,083 | A | 5/1979 | Imler et al. .................... 141/4 |
| 4,240,381 | A | 12/1980 | Lowther ....................... 123/26 |
| 4,260,000 | A | 4/1981 | McGahey et al. ............. 141/59 |
| 4,501,253 | A | 2/1985 | Gerstmann et al. ......... 123/527 |
| 4,515,516 | A | 5/1985 | Perrine et al. ................ 417/38 |
| 4,522,159 | A | 6/1985 | Engel et al. .................... 123/1 |
| 4,527,600 | A | 7/1985 | Fisher et al. .................... 141/4 |
| 4,531,558 | A | 7/1985 | Engel et al. .................. 141/44 |
| 4,646,940 | A | 3/1987 | Kramer et al. ................. 222/1 |
| 4,653,986 | A | 3/1987 | Ashton ....................... 417/243 |
| 4,749,384 | A | 6/1988 | Nowobilski et al. ........... 55/27 |
| 4,966,206 | A | 10/1990 | Baumann et al. ............. 141/83 |
| 4,984,457 | A | 1/1991 | Morris ........................ 73/149 |
| 5,029,622 | A | 7/1991 | Mutter .......................... 141/4 |
| 5,156,198 | A | 10/1992 | Hall ............................ 141/94 |
| 5,169,295 | A | 12/1992 | Stogner et al. ............. 417/339 |
| 5,238,030 | A | 8/1993 | Miller et al. ................... 141/4 |
| 5,259,424 | A | 11/1993 | Miller et al. ................... 141/4 |
| 5,351,726 | A | 10/1994 | Diggins ........................ 141/4 |
| 5,370,159 | A | 12/1994 | Price ............................. 141/4 |
| 5,409,046 | A | 4/1995 | Swenson et al. ............. 141/11 |
| 5,454,408 | A | 10/1995 | DiBella et al. ............. 141/197 |
| 5,538,051 | A | 7/1996 | Brown et al. ................. 141/18 |
| 5,628,349 | A | 5/1997 | Diggins et al. ................ 141/3 |
| 5,694,985 | A | 12/1997 | Diggins ........................ 141/4 |

OTHER PUBLICATIONS

Haskel CNG Minipak Brochure, Motorfuelers, Inc., Mar. 11, 1995, four pages.

*Primary Examiner*—Timothy L. Maust
(74) *Attorney, Agent, or Firm*—Locke Liddell & Sapp, LLP

(57) ABSTRACT

A dual service system and method for selectively compressing and dispensing methane, hydrogen, and variable mixtures of methane and hydrogen for use as a gaseous fuel. The use of an in-line gas density meter, hydraulic intensifier, pressurized gas cooler, optional intermediate storage and multiple dispensers are disclosed. An inline gas density meter is used in combination with a programmable logic controller and a control valve on the hydrogen supply line to create a closed feedback loop for selectively controlling the hydrogen content of the resultant pressurized fuel gas.

33 Claims, 1 Drawing Sheet

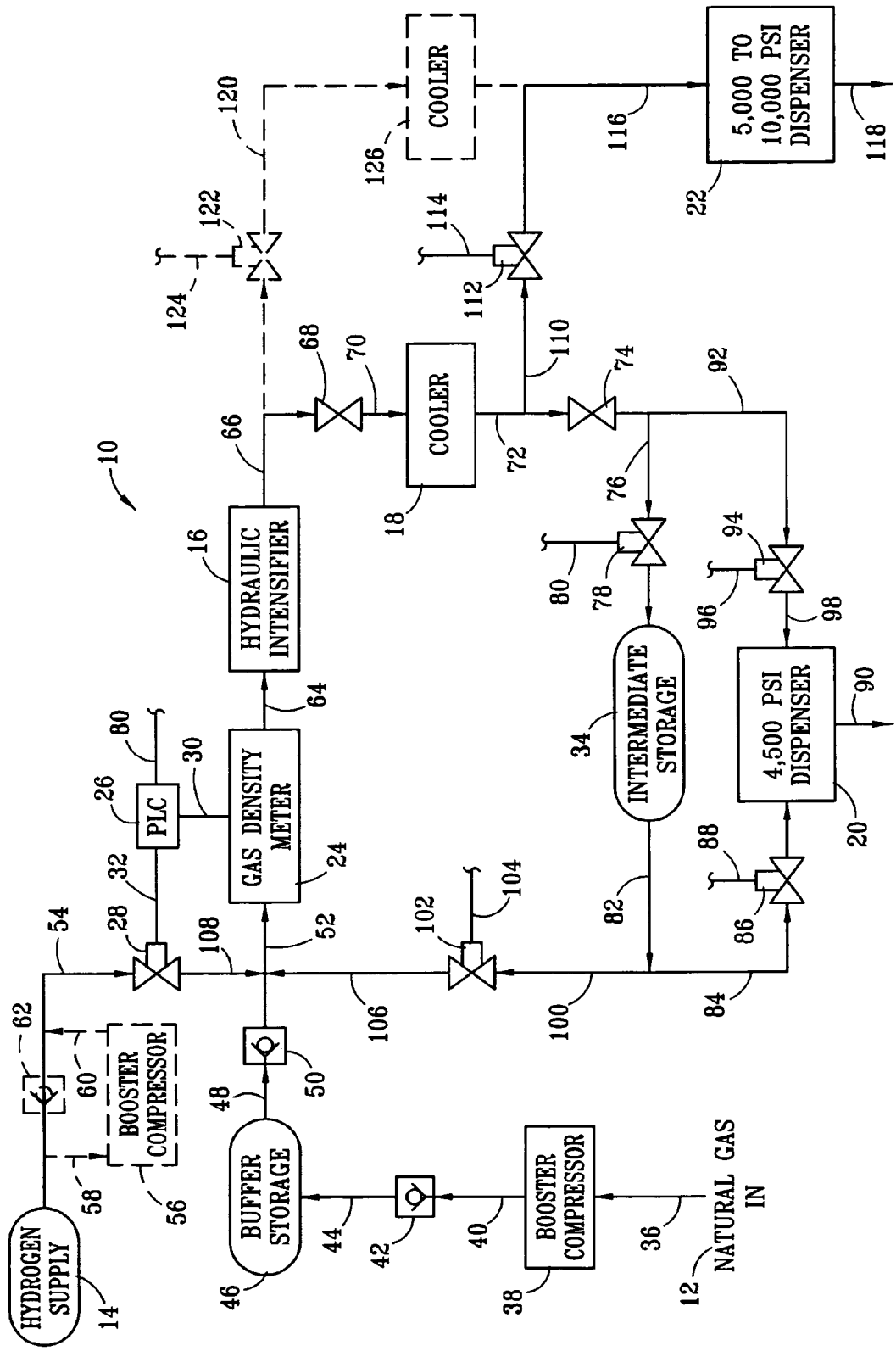

DUAL-SERVICE SYSTEM AND METHOD FOR COMPRESSING AND DISPENSING NATURAL GAS AND HYDROGEN

BACKGROUND OF THE INVENTION

1. Field of the Invention

This invention relates to a system and method for selectively compressing and dispensing methane, hydrogen and variable mixtures of methane and hydrogen, preferably for vehicular refueling applications. The use of methane in the form of natural gas is preferred.

2. Description of Related Art

Systems and methods for compressing fuel gas and for refilling vehicle storage tanks with fuel gas are disclosed, for example, in U.S. Pat. Nos. 5,351,726; 5,538,051; 5,628,349; and 5,694,985. Such systems are presently being used in many locations to provide clean-burning compressed natural gas ("CNG") for use in private and commercial vehicles.

During recent years, there has been growing interest in the use of hydrogen as an alternative fuel. While the increased use of hydrogen as a vehicular fuel gas will reduce the depletion rate of naturally occurring hydrocarbons and also reduce hydrocarbon emissions into the atmosphere, it also presents new problems. First, because hydrogen is significantly less dense than natural gas at atmospheric conditions, it must be compressed to higher pressures than natural gas in order to force a sufficient amount into a vehicular fuel tank to achieve a satisfactory operating range before refueling. Second, because hydrogen must be compressed to such high pressures for effective refueling, the time required for refueling can be longer than is practicable for everyday vehicular use.

Also, the effective implementation of either CNG or hydrogen refueling systems requires a sufficient number of refueling stations to make the fuel readily available to users who live and drive over a widespread geographical area. This can become prohibitively expensive if separate stations are required for the different fuels, or even if different stand-alone compression and dispensing systems are required in order to make either CNG or hydrogen available at a single station location.

SUMMARY OF THE INVENTION

The present invention is a dual-service compression and refueling system providing refueling capability and flexibility that were neither previously known nor available to either refueling station owners or vehicle operators. Using the system and method of the invention, one can use a single compressor installation and control system to compress, store and dispense methane or natural gas, hydrogen, or variable mixtures of methane or natural gas and hydrogen, at pressures and densities that are appropriate for an intended use. Using the same equipment installation, an operator can easily switch from essentially pure CNG to essentially pure hydrogen, or can blend CNG and hydrogen in a desired ratio to dispense a pressurized, blended gaseous fuel having a desired density, pressure and fuel value. An inline gas density meter is used in combination with a programmable logic controller and a control valve on the hydrogen supply line to create a closed feedback loop for selectively controlling the hydrogen content of the resultant pressurized fuel gas. Tests demonstrate that a system configured as disclosed herein can successfully switch from CNG to hydrogen service delivering 99.993% hydrogen in as little as 15 seconds.

According to one preferred embodiment of the invention, a system for selectively mixing, compressing, cooling and dispensing methane and hydrogen is disclosed that comprises a low-pressure source of methane (most preferably in the form of natural gas); a low-pressure hydrogen gas source; a hydraulic intensifier or other similarly effective compressor to further pressurize the methane, hydrogen or mixtures of methane and hydrogen to a desired higher pressure; a cooler for the pressurized gas; intermediate storage for pressurized gas; a dispenser; gas flow lines connecting the gas sources, hydraulic intensifier, cooler; intermediate storage; and dispenser; valves controllable to adjust the flow of methane or hydrogen through the gas flow lines; and, most preferably, an electronic controller programmed to control the valves to achieve a desired fuel content, density and pressure.

According to another preferred embodiment of the invention, a plurality of dispensers are provided and operatively connected in the system described above to facilitate dispensing pressurized gaseous fuel to a plurality of vehicles simultaneously.

According to another preferred embodiment of the invention, a plurality of dispensers are provided and operatively connected in the system described in paragraph [0006] above to facilitate dispensing two or more gaseous fuels simultaneously, at least two of which have different compositions.

According to another preferred embodiment of the invention, at least one booster compressor is linked in series with the hydraulic intensifier of a system as described in paragraph [0006] above to boost the pressure of the gas entering the hydraulic intensifier.

According to another preferred embodiment of the invention, at least two coolers are provided in a system as described in paragraph [0006] above for separately cooling compressed methane and hydrogen discharged from the hydraulic intensifier prior to dispensing or storage.

According to another preferred embodiment of the invention, an in-line gas density meter is provided between the low-pressure gas sources and the hydraulic intensifier in a system as described in paragraph [0006] above. The gas density meter is most preferably installed in the gas supply line together with a programmable logic controller and an upstream control valve in the hydrogen supply line to establish closed loop feedback whereby the flow volume of hydrogen to the hydraulic intensifier can be controlled in response to the density of the inlet gas upstream of the hydraulic intensifier. This is particularly significant when methane and hydrogen are being combined to produce a blended gaseous fuel.

According to another preferred embodiment of the invention, a method is disclosed that comprises the steps of providing separate low-pressure sources of methane (most preferably in the form of natural gas) and hydrogen; selectively combining and compressing low-pressure methane and hydrogen in desired ratios to produce higher-pressure hydrogen-methane gas mixtures; cooling the higher-pressure gas mixtures; and dispensing the higher-pressure gas mixtures.

According to another preferred embodiment of the invention, a method is disclosed as described above wherein the ratio of methane to hydrogen in the gas mixtures ranges from about 10:0 to 0:10.

According to another preferred embodiment of the invention, a method is disclosed as described in paragraphs [0012] and [0013] above wherein the methane and hydrogen are compressed using a hydraulic intensifier.

According to another preferred embodiment of the invention, a method is disclosed as described in paragraph [0012] above wherein the methane and hydrogen from the low-pressure sources are boosted to an intermediate pressure level before entering the hydraulic intensifier for further compression to a higher pressure.

According to another preferred embodiment of the invention, a method is disclosed as described in paragraphs [0012] and [0013] above wherein the higher-pressure gas is dispensed simultaneously through a plurality of dispensers.

According to another preferred embodiment of the invention, a method is disclosed as described in paragraphs [0012] and [0013] above wherein the higher-pressure gas is directed to intermediate storage after being discharged from the cooler.

According to another preferred embodiment of the invention, a method is disclosed as described in paragraph [0017] wherein the gas in intermediate storage is recycled through the hydraulic intensifier and is further compressed to a higher pressure.

According to another preferred embodiment of the invention, a method is disclosed as described in paragraph [0017] wherein the gas in intermediate storage is dispensed into a vehicular fuel storage tank then having an internal storage pressure less than the intermediate storage pressure.

BRIEF DESCRIPTION OF THE DRAWINGS

The apparatus of the invention is further described and explained in relation to the accompanying drawing, which is a simplified diagrammatic view depicting the principal hardware elements of the subject dual service system and the general flow configuration used for implementing the method of the invention with the principal elements of the system.

DESCRIPTION OF THE PREFERRED EMBODIMENTS

Referring to the drawing, system 10 of the invention preferably comprises a low-pressure source 12 of methane, most preferably in the form of natural gas; a low pressure hydrogen source 14; a compressor, most preferably a hydraulic intensifier 16; at least one cooler 18 for the pressurized fuel gas, and at least one dispenser 20 for use in directing the cooled, pressurized fuel gas into a desired end-use receptacle, most preferably a vehicular fuel storage tank.

As used herein, the term "low-pressure" is intended to mean the pressure at which the particular gas is originally provided to system 10. For natural gas, low-pressure source 12 can be, for example, the line pressure in a normal utility distribution service line, in which the gas is normally pressurized to from about 5 to about 60 psi for general distribution. Where utility transmission pipeline gas is available, such gas is normally pressurized to from about 60 to about 600 psi. For hydrogen, low-pressure source 14 may be as low as from about 5 to about 15 psi, for example, if the hydrogen is being made on-site, or as great as 3000 psi or more if the hydrogen is delivered to the site in pressurized tube trailers. In either instance, it is intended that hydraulic intensifier 16, the preferred compressor apparatus for use in the subject system and method, be capable of further compressing and pressurizing the fuel gas, whether methane, hydrogen or a combination of the two, to a pressure ranging from at least about 4500 psi for substantially pure methane to about 10,000 psi for substantially pure hydrogen.

In some cases, depending upon the particular gas and low-pressure source used, it may be more economical and thermally efficient to provide a booster compressor between the low-pressure source 12, 14 and hydraulic intensifier 16. Arrow 36 shows the flow of natural gas from low-pressure source 12 into booster compressor 38, preferably a conventional reciprocating compressor, to raise the pressure from line pressure to, for example, about 350 psi. From compressor 38, the natural gas flows through line 40, check valve 42 and line 44 into a buffer storage tank 46 that is suitable for storage of natural gas at such pressures. Because it is anticipated that, in many cases, the hydrogen will not be made on site, booster compressor 56, inlet line 58 and outlet line 60 are shown in dashed outline. Where a booster compressor 56 is needed for hydrogen, a check valve 62 should be provided in flow line 54 between inlet and outlet lines 58, 60, respectively.

The flow of hydrogen to hydraulic intensifier 16 is preferably controlled using a closed feedback loop comprising gas flow lines 54, 108, 52, solenoid-operated control valve 28, gas density meter 24, programmable logic controller (PLC) 26, and electrical control lines 30, 32. The use of gas density meter 24 is particularly beneficial in an operational mode where hydrogen is mixed with methane to achieve a mixed methane-hydrogen fuel gas having a desired density or hydrogen quality upstream of hydraulic intensifier 16. PLC 26 can be programmed to target a specific density that is dependent upon the composition, temperature and pressure of the gas mixture.

It will be appreciated by those of skill in the art that valve 28 can be pulse driven or, alternatively, can be a proportional flow control valve controlled either pneumatically or electrically by PLC 26. Depending upon the values set or programmed in advance into PLC 26, control valve 28 will act as a throttling valve to control the rate at which hydrogen is admitted into flow lines 108 and 52 in response to the desired density or quality of mixed gases measured by gas density meter 24. Control lines 30, 32 are not needed where gas density meter 24, PLC 26 and control valve 28 are wireless models equipped to transmit and receive signals as needed to implement this flow scheme.

It should also be appreciated that the same controls can be utilized with flow control valve 102, either alone or in combination with control valve 28, to mix gases to a desired mixed gas density or quality upstream of hydraulic intensifier 16. Thus, for example, system 10 can be used selectively to compress, cool and dispense substantially pure methane or natural gas (at either buffer storage pressure or intermediate storage pressure), substantially pure hydrogen, or mixtures of methane and hydrogen in mole ratios such as 1:1, 3:2 or 3:1 by simply controlling the amount of hydrogen added to a flow of methane passing through flow line 52. It is presently believed that the use of as little as 30% or less hydrogen in mixture with CNG in the fuel of an internal combustion engine can achieve a significant reduction in emissions as compared to the use of CNG alone, and CNG is already known to reduce emissions significantly as compared to emissions experienced using gasoline fuel.

Because the hydrogen pressure in flow line 108 and the intermediate storage pressure in line 106 (assuming control valve 102 is open) will typically be at least as great as the methane pressure exiting buffer storage 46 through line 48, check valve 50 is normally all that is required to keep hydrogen or methane from flowing backward into buffer storage 46. When buffer storage 46 is used to provide substantially pure methane to hydraulic intensifier 16, control valves 28 and 102 are closed. If desired, another control valve can be substituted for check valve 50 to provide additional control.

According to a particularly preferred embodiment of the invention, methane can be pressurized, for example, from about 350 psi to about 3000 psi using hydraulic intensifier 16 during periods of low demand, and pressurized methane discharged from hydraulic intensifier through line 66 can be directed through valve 68 and line 70 to pressurized gas cooler 18, and then through line 76 and control valve 78 to intermediate storage 34. Later, during peak demand periods, methane stored, for example, at 3000 psi in intermediate storage tank 34 can be discharged selectively through flow lines 82, 84 and control valve 86 to dispenser 20, from which it can be dispensed through line 90 into a vehicular storage tank or other tank having an internal pressure lower than the pressure of the stored gas. Once the vehicle tank pressure approaches the storage tank pressure, control valve 86 can be closed and methane pressurized by hydraulic intensifier 16 to a level of 4500 pounds or greater can be directed through cooler 18, valve 74, flow line 92, control valve 94 and flow line 98 into dispenser 20 for use in "topping off" the vehicle storage tank. This later stage of operation can also be performed by closing control valve 86 and opening valve 102 so that methane from intermediate storage vessel 34 is directed through lines 82, 100, 106, 52 and 64 into hydraulic intensifier 16, which can then boost the gas pressure, for example, from about 3000 psi to about 4500 psi or greater. Because the gas pressure in intermediate storage vessel 34 is greater than the pressure inside buffer storage 46, check valve 50 will prevent the higher-pressure gas from flowing backward through line 48.

Similarly, by closing control valve 86 and opening control valves 102 and 28, methane and hydrogen, both pressurized to about 3000 psi, can be mixed in a desired ratio and directed to hydraulic intensifier 16 through flow line 52, gas density meter 24 and flow line 64 so that the pressure of the mixed fuel gas can be boosted from the inlet pressure to a desired outlet pressure such as, for example, from 6000 to 7500 psi or more. The pressurized methane-hydrogen fuel gas mixture is then cooled in cooler 18 and, if compressed to a pressure greater than the maximum rating of dispenser 20, is directed instead through flow line 110, control valve 112 and flow line 116 into dispenser 22 having a higher rated operating pressure to be dispensed through line 118 into a vehicle storage tank or to another downstream storage vessel or application.

Alternatively, by closing control valve 102 and opening control valve 28, methane from buffer storage 46 and hydrogen can be mixed in a desired ratio and directed to hydraulic intensifier 16 through flow line 52, gas density meter 24, and flow line 64 so that the pressure of the mixed fuel gas can be boosted from the inlet pressure to a desired outlet pressure such as, for example, from 3000 to 5000 psi. In this case, the methane and hydrogen inlet pressures and the associated inlet valves must be selected so as to insure that all the gas will flow toward hydraulic intensifier 16 and that neither gas will be able to flow backward into the source of the other gas through the respective valves. After compression by hydraulic intensifier 16, the pressurized methane-hydrogen fuel gas is desirably cooled in cooler 18 and, if compressed to a pressure greater than the maximum rating of dispenser 20, is directed instead through flow line 110, control valve 112 and flow line 116 into dispenser 22. Dispenser 22 desirably has a higher rated operating pressure than dispenser 20, but can likewise dispense the higher pressure gas into a vehicle storage tank, or to another downstream storage vessel or application. Although two dispensers having different rated pressures are depicted, it will be appreciated by those of ordinary skill in the art upon reading this disclosure that the system of the invention can also include more dispensers rated at the same or different pressures as needed for a particular application.

Alternatively, system 10 can be conveniently used for alternating pure methane and pure hydrogen service using a single hydraulic intensifier 16 by providing a parallel, high-pressure flow path comprising control valve 122, flow line 120 and cooler 126. When operating in this mode, it may be desirable to substitute a control valve for valve 68. When switching from methane or CNG to hydrogen service, it may be desirable to flush the system downstream of hydraulic intensifier 16 into intermediate storage vessel 34. When operating in a test mode and switching from CNG to hydrogen service, it has been possible to obtain 99.993% hydrogen through hydraulic intensifier 16 within 15 seconds. When switching from CNG to hydrogen service, once the required hydrogen purity is reached, the valves supplying dispenser 22 can be controlled and dispenser 22 can be activated to dispense high-pressure hydrogen fuel through line 118.

Referring again to the drawing, control valves 78, 86, 94, 102, 112 and 122 are depicted with electrical control lines 80, 88, 86, 104, 114 and 125, respectively. Each of these control lines can be directed to PLC 26, or to another PLC or CPU as desired for a particular application. For illustrative simplification, only control line 80, paired with control valve 78, is depicted as being connected to PLC 26. It should be understood, however, that hard-wired or wireless connections are also desirably provided between each control valve and an associated electronic controller. As used herein, the term "control valve" preferably refers to a solenoid-operated valve controlled in response to inputs received either electronically or pneumatically from a controller that is either pre-programmed or manually operated to implement the desired valve settings for an intended operating mode.

Through use of the apparatus and method described herein, it is believed that existing CNG vehicular refueling stations can be converted economically and efficiently to dual-service CNG-hydrogen refueling stations, thereby substantially reducing real estate and capital costs for implementing hydrogen service while simultaneously providing flexibility of operation to dispense methane, hydrogen, or mixtures of methane and hydrogen in virtually any desired ratio. For safety reasons, it is of course important that any existing equipment (vessels, flow lines, flanges, valves, compressors, coolers, connectors, etc.) not be used in hydrogen service requiring fill pressures higher than the pressures for which such equipment is rated. In some instances, this may require retrofitting or supplementation of existing equipment to facilitate a dual-service mode of operation.

While the use of a hydraulic intensifier 16 is preferred in the system and method of the invention, reciprocating compressors can also be used provided that they are serviceable with both methane and hydrogen, and are capable of operating at inlet and outlet pressures such as those disclosed herein. Dispenser 20 is nominally rated in the drawing at 4,500 psi because that pressure is typical of pressures encountered in or necessary for CNG service. Dispenser 22 is similarly rated in the drawing at 5,000 to 10,000 psi because that pressure range is typical of pressures that might be encountered in hydrogen or mixed methane-hydrogen service. The stated pressures should not be construed as limiting, but rather as illustrative of pressures that may be useful for a desired application. All individual equipment items required to build, retrofit, implement and operate the system and method disclosed herein are believed to be known and commercially available to those of ordinary skill in the art having the benefit of this disclosure and the disclosure appearing in U.S. Pat. No. 5,351,726.

While the selective use of methane or natural gas and hydrogen in varying ratios is disclosed herein in relation to the preferred embodiment of a vehicular refueling station, it will be appreciated that there are other applications where the same system and method are equally applicable for use with other gases.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventor is legally entitled.

What is claimed is:

1. A dual service system for use in compressing and dispensing pressurized gas, the system comprising:
   a methane gas source at an inlet pressure greater than atmospheric pressure;
   a hydrogen gas source at an inlet pressure greater than atmospheric pressure;
   a compressor having an inlet and an outlet, the inlet communicating selectively with the methane gas source, with the hydrogen gas source, and with both the methane gas source and the hydrogen gas source, and the outlet having a discharge pressure greater than the inlet pressure of the methane gas and hydrogen gas;
   valves selectively controlling the flow of methane gas and hydrogen gas to the compressor;
   a cooler in fluid communication with the compressor outlet, the cooler being operable at a gas pressure at least as great as the discharge pressure of the compressor; and
   a dispenser in downstream fluid communication with the cooler.

2. The dual service system of claim 1 wherein the compressor is a hydraulic intensifier.

3. The dual service system of claim 1 wherein the methane gas source is a natural gas source.

4. The dual service system of claim 1 wherein the inlet pressure of the methane gas ranges from about 5 psi to about 600 psi.

5. The dual service system of claim 1 wherein the inlet pressure of the hydrogen gas ranges from about 5 psi to about 3000 psi.

6. The dual service system of claim 1, further comprising a booster compressor disposed between and in fluid communication with the methane gas source and the compressor inlet.

7. The dual service system of claim 1, further comprising a booster compressor disposed between and in fluid communication with the hydrogen gas source and the compressor inlet.

8. The dual service system of claim 1, further comprising an intermediate storage vessel for pressurized gas that is disposed in downstream fluid communication with the cooler.

9. The dual service system of claim 8 wherein the intermediate storage vessel has an outlet that communicates selectively with a dispenser and with the compressor inlet.

10. The dual service system of claim 1 comprising a plurality of gas coolers.

11. The dual service system of claim 1 comprising a plurality of valves that are controllable to selectively control the flow of methane and hydrogen through the system.

12. The dual service system of claim 11 comprising a programmable logic controller communicating with at least one of the valves.

13. The dual service system of claim 1 comprising an in-line gas density meter disposed between the low pressure gas sources and the compressor inlet.

14. The dual service system of claim 13 wherein the gas density meter is operatively linked to a programmable logic controller.

15. The dual service system of claim 14 wherein the programmable logic controller is operatively linked to a control valve disposed in a flow line downstream from the low-pressure hydrogen gas source and upstream from the gas density meter.

16. The dual service system of claim 15 wherein the gas density meter, programmable logic controller and control valve cooperate to provide closed loop feedback whereby a flow of low-pressure hydrogen to the compressor inlet can be controlled in response to the density of the inlet gas upstream of the hydraulic intensifier.

17. The dual service system of claim 1 comprising a plurality of dispensers.

18. A method for compressing, cooling and dispensing methane and hydrogen, comprising the steps of:
   providing separate low-pressure sources of methane and hydrogen;
   selectively combining and compressing methane and hydrogen in desired ratios to produce a pressurized fuel gas having a pressure greater than the low-pressure sources of methane and hydrogen;
   cooling the pressurized fuel gas; and
   dispensing the pressurized fuel gas.

19. The method of claim 18 wherein the methane is provided in the form of natural gas.

20. The method of claim 18 wherein the mole ratio of methane to hydrogen ranges between about 10:0 and about 0:10.

21. The method of claim 20 wherein the mole ratio of methane to hydrogen is about 3:2.

22. The method of claim 20 wherein the mole ratio of methane to hydrogen is about 3:1.

23. The method of claim 20 wherein the mole ratio of methane to hydrogen is about 1:1.

24. The method of claim 18 wherein the methane and hydrogen are compressed using a hydraulic intensifier.

25. The method of claim 24 wherein the pressure of the methane from the low-pressure source is boosted to an intermediate pressure and then charged to the hydraulic intensifier.

26. The method of claim 24 wherein the pressure of the hydrogen from the low-pressure source is boosted to an intermediate pressure and then charged to the hydraulic intensifier.

27. The method of claim 18 wherein the cooled, pressurized fuel gas is dispensed through a plurality of dispensers.

28. The method of claim 18 wherein the pressurized fuel gas is directed to intermediate storage from the cooler.

29. The method of claim 24 wherein the pressurized fuel gas is directed to intermediate storage from the cooler and is subsequently recycled through the hydraulic intensifier and further compressed to a higher pressure.

30. The method of claim 24 wherein the pressurized fuel gas is directed to intermediate storage from the cooler and is subsequently dispensed into a vehicular fuel storage tank having an internal storage pressure that is less than the intermediate storage pressure.

31. The method of claim 18 wherein the low pressure source of methane has a pressure ranging from about 5 to about 600 psi.

32. The method of claim 18 wherein the low pressure source of hydrogen has a pressure ranging from about 5 to about 3000 psi.

33. The method of claim 18 wherein pressurized fuel gas is dispensed at pressures ranging between 4500 and 10,000 psi.

* * * * *